(12) United States Patent
Ghosh et al.

(10) Patent No.: US 10,936,982 B1
(45) Date of Patent: Mar. 2, 2021

(54) DYNAMIC DASHBOARD FOR BUSINESS OPERATIONS

(71) Applicant: Wells Fargo Bank, N.A., San Francisco, CA (US)

(72) Inventors: Parul Ghosh, Bangalore (IN); Shishir Vasant Rao, Bengaluru (IN); Niravkumar N. Bajaj, Pune (IN); Priyanka Dixit, Bangalore (IN); Arvind Kumar Gottapally, Hyderabad (IN); Abhishek Kumar, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/740,824

(22) Filed: Jan. 13, 2020

(51) Int. Cl.
*G06Q 10/06* (2012.01)
*H04L 29/08* (2006.01)

(52) U.S. Cl.
CPC ..... *G06Q 10/0635* (2013.01); *G06Q 10/0639* (2013.01); *G06Q 10/063114* (2013.01); *H04L 67/36* (2013.01)

(58) Field of Classification Search
USPC ........................................................ 715/747
See application file for complete search history.

(56) References Cited

U.S. PATENT DOCUMENTS

| | | | | |
|---|---|---|---|---|
| 6,601,233 B1 * | 7/2003 | Underwood | ............... | G06F 8/24 |
| | | | | 717/100 |
| 8,457,996 B2 * | 6/2013 | Winkler | ................. | G06Q 10/00 |
| | | | | 705/7.11 |
| 8,806,505 B1 * | 8/2014 | Sherry | ............... | G06Q 10/0631 |
| | | | | 718/106 |
| 9,774,616 B2 * | 9/2017 | Flores | ................. | H04L 63/1433 |
| 9,923,917 B2 * | 3/2018 | Fausto | ............... | H04L 63/1433 |
| 10,044,746 B2 * | 8/2018 | Vallone | ............... | H04L 41/0886 |
| 10,204,312 B2 * | 2/2019 | Singh | ..................... | G06N 5/022 |
| 10,313,389 B2 * | 6/2019 | Hovor | ................. | H04L 63/1433 |
| 10,320,828 B1 * | 6/2019 | Derbeko | ............... | G06F 21/577 |
| 10,613,711 B1 * | 4/2020 | Makovsky | .......... | G06F 11/3409 |
| 2008/0005002 A1 * | 1/2008 | Ferris | ..................... | G06Q 40/06 |
| | | | | 705/36 R |
| 2009/0119545 A1 * | 5/2009 | Pham | .................. | G06F 11/0784 |
| | | | | 714/39 |
| 2011/0214064 A1 * | 9/2011 | Schneider | ........... | G06F 21/6218 |
| | | | | 715/741 |

(Continued)

*Primary Examiner* — Reza Nabi
(74) *Attorney, Agent, or Firm* — Merchant & Gould P.C.

(57) ABSTRACT

An example method for rendering a dynamic dashboard for an electronic computing device includes receiving data regarding a server computing device. The data indicates whether there are any current or potential problems that impact an operation of the server computing device. Information is obtained regarding any business applications currently running on the server computing device. Information is obtained regarding customers using the business applications currently running on the server computing device. The dynamic dashboard is created to include the information regarding the customers and the business applications currently running on the server computing device and that describes any current or potential problems based on the data. Content of the dynamic dashboard is tailored based upon an identity of an individual who is accessing the dynamic dashboard. The dynamic dashboard is rendered on the electronic computing device.

20 Claims, 15 Drawing Sheets

(56) References Cited

U.S. PATENT DOCUMENTS

| | | | | |
|---|---|---|---|---|
| 2013/0090942 | A1* | 4/2013 | Robinson | G06Q 10/10 |
| | | | | 705/2 |
| 2013/0325545 | A1* | 12/2013 | Mordvinova | G06Q 10/06 |
| | | | | 705/7.28 |
| 2016/0335579 | A1* | 11/2016 | Anderson | G06Q 10/06393 |
| 2017/0123397 | A1* | 5/2017 | Billi | G06Q 10/063 |
| 2017/0286958 | A1* | 10/2017 | Herman | G06Q 20/3821 |
| 2018/0025433 | A1* | 1/2018 | Crabtree | G06Q 40/08 |
| | | | | 705/4 |
| 2018/0275986 | A1* | 9/2018 | Ghosh | G06F 8/70 |
| 2018/0276372 | A1* | 9/2018 | Crabtree | G06F 8/65 |
| 2018/0374363 | A1* | 12/2018 | Ortiz | G07C 5/008 |
| 2019/0205773 | A1* | 7/2019 | Ackerman | G06Q 10/067 |
| 2019/0222597 | A1* | 7/2019 | Crabtree | H04L 43/08 |
| 2020/0152047 | A1* | 5/2020 | Pelski | G08B 5/22 |

\* cited by examiner

There is a delay in verifying your financial information. A problem has been identified with one of our server computing devices. We are working on correcting the problem. Thank you for your patience.

A problem has been identified in transferring money between banks. A production server computing device has been determined to require a manual reset. IT was notified on November 13, 2019 at 13:29.

A problem has been identified in transferring money between banks. Production server computing device ID # 12345 has been determined to require a manual reset by IT on November 13, 2019 at 13:29. Data backup operations are currently proceeding. The manual reset is scheduled for November 13, 2019 at 13:45.

FIG. 11

DYNAMIC DASHBOARD FOR BUSINESS OPERATIONS

BACKGROUND

Maintaining normal business operations can be critical for business organizations. Disruptions to business operations can result in large financial losses for the business organizations. Therefore, maintaining continuity of business operations is a high priority for many business organizations.

Business continuity management is a strategy business organizations can adopt to proactively identify potential problems relating to business operations, to minimize downtime, and to have strategies in place to recover from disruptions.

SUMMARY

Embodiments of the disclosure are directed to rendering a dynamic dashboard for an electronic computing device. The method comprises: receiving data regarding a server computing device, the data indicating whether there are any current or potential problems that impact an operation of the server computing device; obtaining information regarding any business applications currently running on the server computing device; obtaining information regarding customers using the business applications currently running on the server computing device; creating the dynamic dashboard that includes the information regarding the customers and the business applications currently running on the server computing device and that describes any current or potential problems based on the data; tailoring content of the dynamic dashboard based upon an identity of an individual who is accessing the dynamic dashboard; and rendering, on the electronic computing device, the dynamic dashboard.

In another aspect, a method for rendering a dynamic dashboard for an electronic computing device comprises: receiving data regarding a server computing device, the data indicating whether there are any current or potential problems than can impact an operation of the server computing device; obtaining information regarding any business applications currently running on the server computing device; obtaining information regarding customers using the business applications currently running on the server computing device; and rendering a view of the dynamic dashboard that is configured for a business team member of a financial organization, the view of the dynamic dashboard listing all currently running business applications on the server computing device that are initiated by or for the customers using the business applications, the view of the dynamic dashboard also listing a quantity of customers that are associated with each the currently running business applications.

In yet another aspect, an electronic computing device comprises a processor; and system memory including instructions thereon which, when executed by the processor, cause the electronic computing device to: receive data regarding a server computing device, the data indicating whether there are any current or potential problems than can impact an operation of the server computing device; obtain information regarding any business applications currently running on the server computing device; obtain information regarding customers using the business applications currently running on the server computing device; receive an identity of an individual who is authorized to access a dynamic dashboard; create the dynamic dashboard that includes the information regarding the customers and the business applications currently running on the server computing device and that describes any current or potential problems based on the data; and render on the electronic computing device a view of the dynamic dashboard that is based on the identity of the individual and that is configured for the individual.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows an example dialog box that can be used with the dynamic dashboard generated by the dashboard engine of FIG. 2.

FIG. 7 shows another example dialog box that can be used with the dynamic dashboard generated by the dashboard engine of FIG. 2.

FIG. 8 shows yet another example GUI for the dynamic dashboard generated by the dashboard engine of FIG. 2.

FIG. 11 shows yet another example dialog box that can be used with the dynamic dashboard generated by the dashboard engine of FIG. 2.

DETAILED DESCRIPTION

The present disclosure is directed to a dynamic dashboard for business systems of a business organization. The dynamic dashboard can provide a real-time status of business applications running on the business organization. In addition, the dynamic dashboard can provide a plurality of views so that different stakeholders of the business organization can view information regarding the real-time status that is pertinent to the stakeholders. The dynamic dashboard is dynamic because data displayed on the dynamic dashboard is updated as the data becomes available.

For the examples of this disclosure, the systems and methods are described for a financial organization, such as a bank. For this disclosure, the stakeholders of the financial organization are customers, a business team, and information technology (IT) personal. As discussed in more detail later herein, the dynamic dashboard can present different views for each of these stakeholders.

Example business applications that can be running at the financial organization can include, without limitations, business applications for processing customer requests for a mortgage, a credit card, a checking account, a personal loan, a personal line of credit, and for loans to establish and finance a business. Business applications internal to the financial institution can include facilitating a transfer of bank funds overnight to one or more affiliated banks during a bank money sweep. Other business applications are possible.

The dynamic dashboard can obtain the real-time status for the financial organization from a monitoring device that can monitor operations of the business applications running at the financial organization and proactively identify operational abnormalities of equipment using during the business applications. The equipment can include, without limitation, server computing devices, databases, websites, and networks used to implement the operations of the business applications. An example of such a monitoring device is described in U.S. patent application Ser. No. 16/740,779, filed on even date herewith, the entirety of which is incorporated by reference.

The systems and methods discussed herein are directed to a computing technology that provides a technical solution for providing a dynamic real-time status of business systems. Business applications running on a production server computer of a business organization can be continually monitored by a monitoring electronic computer. Threats that can impact the business applications can be identified and displayed on a dynamic dashboard. Some of these identified problems can be self-corrected. As a result, business system downtime can be minimized and operational continuity of the business systems can be maintained.

Figure 1:
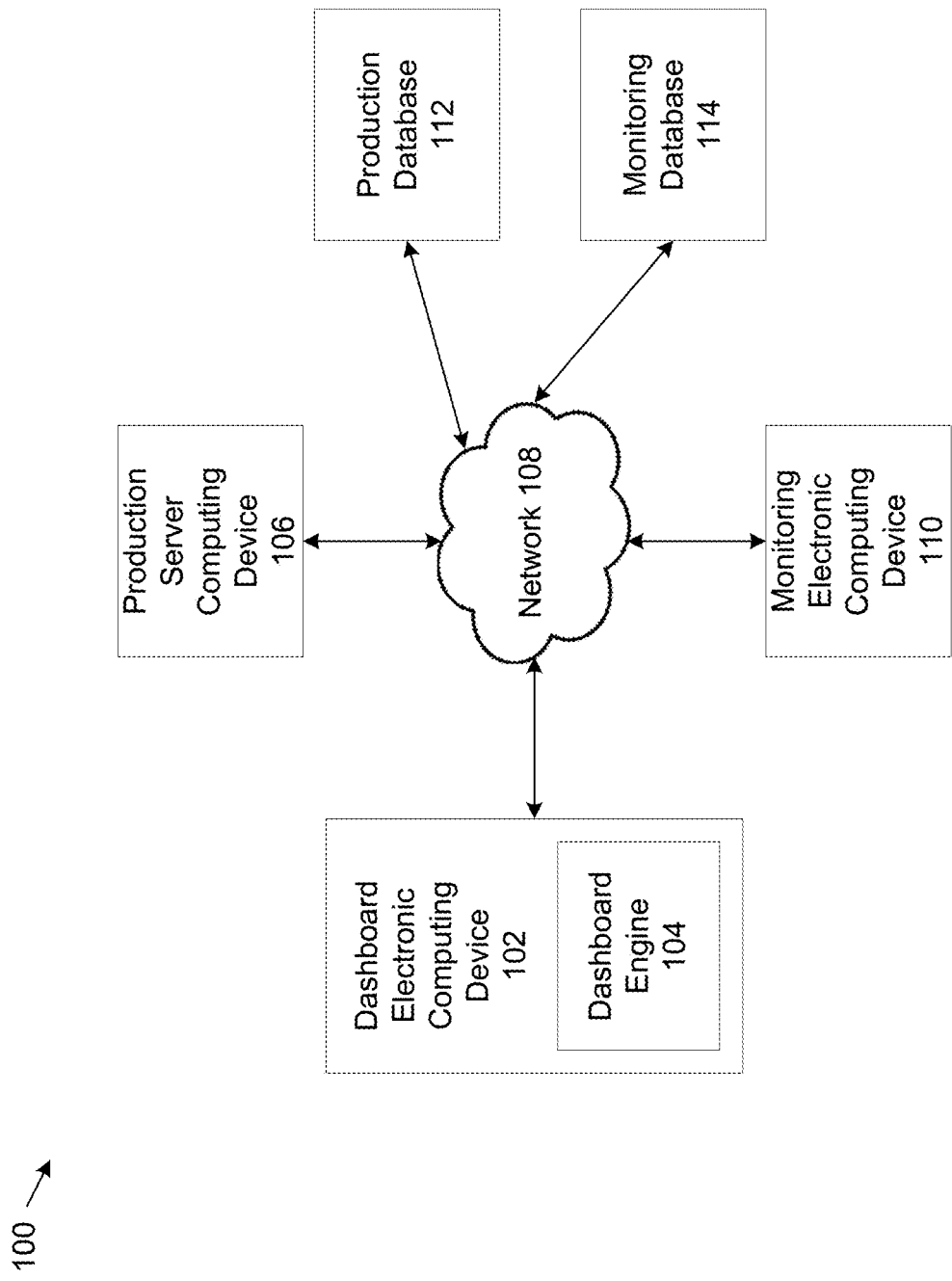
FIG. 1 shows an example system that supports a dynamic dashboard for a business organization.

FIG. 1 shows an example system 100 that can support a dynamic dashboard for a business organization. The system 100 includes a dashboard electronic computing device 102, a production server computing device 106, a network 108, a monitoring electronic computing device 110, a production database 112, and a monitoring database 114. The dashboard electronic computing device 102 includes a dashboard engine 104. More, fewer, or different components are possible. In addition, an alternative dynamic dashboard is described later herein, with regard to FIGS. 13 and 14.

The example dashboard electronic computing device 102 is an electronic computing device that receives operational information regarding the production server computing device 106 and uses this operational information to render the dynamic dashboard on a display device of dashboard electronic computing device 102. The operational information is processed by, and the dynamic is rendered by the dashboard engine 104, as discussed in more detail later herein.

The example network 108 is a computer network and can be any type of wireless network, wired network and cellular network, including the Internet. The dashboard electronic computing device 102, the production server computing device 106, and the monitoring electronic computing device 110 can communicate with each other using network 108.

The example monitoring electronic computing device 110 is an electronic computing device, typically a server computing device, that monitors operation logs of business applications running on the production server computing device 106. The monitoring electronic computing device 110 can identify threats to the operation of the production server computing device 106 and provide information regarding the threats to the dashboard electronic computing device 102.

The example production database 112 is a database associated with the production server computing device 106 and with the financial organization. The production database 112 can store data for individual customers of the financial organization, including personal information, financial account information, information regarding loans, mortgages, personal lines of credit, checking and savings accounts, etc. The production database 112 can also include data for business customers of the financial organization, including assets kept at the financial organization, business lines of credit, etc. The production database 112 can also include status information for the production server computing device 106, including business applications supported, and current and historical operational logs. Other information is possible.

The production database 112 can be distributed over a plurality of databases. The monitoring electronic computing device 110 can be programmed to query (e.g. using Structured Query Language, SQL) the production database 112 to obtain requested information.

The example monitoring database 114 is a database associated with the monitoring electronic computing device 110. Operational data, benchmarks, checklists, and remedial actions for business applications running on the production server computing device 106 can be stored on monitoring database 114.

Figure 2:
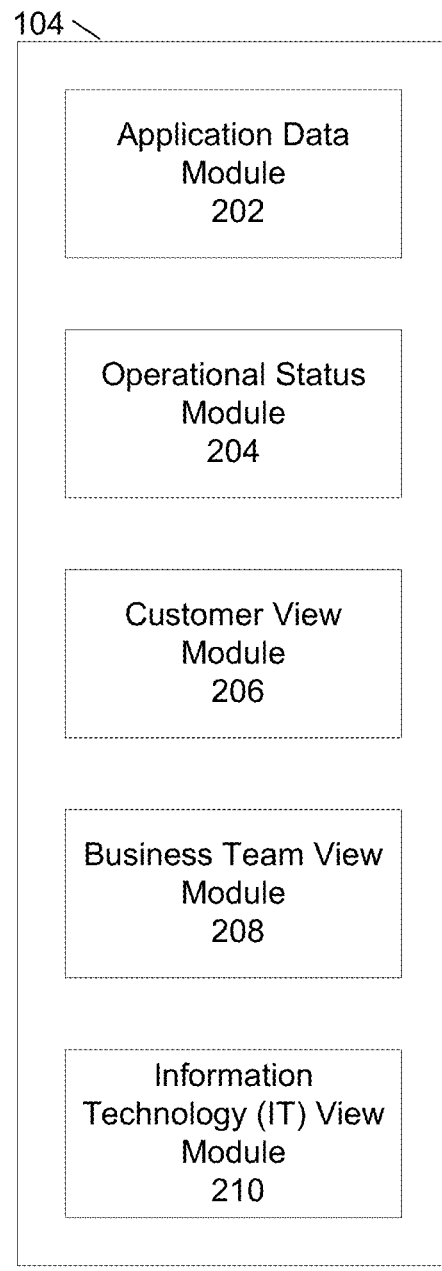
FIG. 2 shows example modules of a dashboard engine of a dashboard electronic computing device of the system of FIG. 1.

FIG. 2 shows example modules of the dashboard engine 104. The modules include an application data module 202, an operational status module 204, a customer view module 206, a business team view module 208, and an information technology (IT) view module 210. More, fewer, or different modules are possible.

The example application data module 202 obtains information for business applications running on the production server computing device 106. The information can be obtained from one or more of the production server computing device 106, the monitoring electronic computing device 110 and associated databases. The information can include the names of the business applications and operational steps that comprise each business application. The information can also include the names and identifiers of customers who are running each business application. The information can further include a summary of the number of customers currently running each business application and each step of each business application. Other information is possible.

The example operational status module 204 obtains from the monitoring electronic computing device 110 operational status information regarding the business applications running on the production server computing device 106. The operation status information can include operational status regarding each business application and the steps of each business application. This can include whether the operation is running properly or whether there is a current or potential problem with any step of each business application. When a business application becomes non-operational, the operational status can include an estimated time frame as to when the business application will be operational. The operational status can also include statistical information regarding components of devices used in each business application. For example, the statistical information can include a temperature of a CPU, the size of a memory cache, and a percent utilization of the CPU. Other operational status information is possible.

The example customer view module 206 implements a graphical user interface (GUI) of the dynamic dashboard that can be accessed by a customer of the financial organization. As discussed in more detail later herein, the GUI for the customer can display a status for any business applications that the customer has initiated and that is currently being processed by the production server computing device 106. The status can include a listing of steps that comprise an implementation of the business application, start and end dates for each step, and an indication of any delays in completing each step. Example business applications that can be initiated by the customer can include opening a checking account, transferring money between accounts, paying bills, and applying for a credit card. Other customer initiated business applications are possible.

The example business team view module 208 implements a GUI of the dynamic dashboard that can be accessed by a business team member of the financial organization. The business team member can be an employee, such as a personal banker, that can provide a customer service function for the financial organization. As discussed in more detail later herein, the GUI for the business team can display a list of all business applications currently open by customers and also display a monetary impact of these business applications. The GUI for the business team can also indicate when there is an unexpected delay or other operational problem that occurs during the implementation of these business applications. The GUI for the business team also permits a drill down that can display the status of individual steps of each transaction. The business team can use information derived from this GUI to identify any problems that have an impact on customers, identify an extent of the monetary impact of the identified problems, and permit the business team to provide alternative application steps, where possible. The business team can also communicate with impacted customers in an attempt to mitigate any negative impact to the customers caused by the identified problems.

The example information technology (IT) view module 210 implements a GUI of the dynamic dashboard that can be accessed by an IT team member of the financial organization. As discussed in more detail later herein, the GUI for the IT team can display a list of all active business applications at the financial organization. The GUI for the IT team can also identify any problems that occur during the implementation of the active business applications. In addition, the GUI for the IT team permits a display of an interactive diagram of network equipment used to implement the active business applications. Furthermore, the GUI for the IT team permits an IT team member to drill down on any device in the interactive a diagram to display an operational status of the device. The operational status can show any threats identified by the monitoring electronic computing device 110 that may affect the operation of the device, and any remedial action recommended by the monitoring electronic computing device 110.

Figure 3:
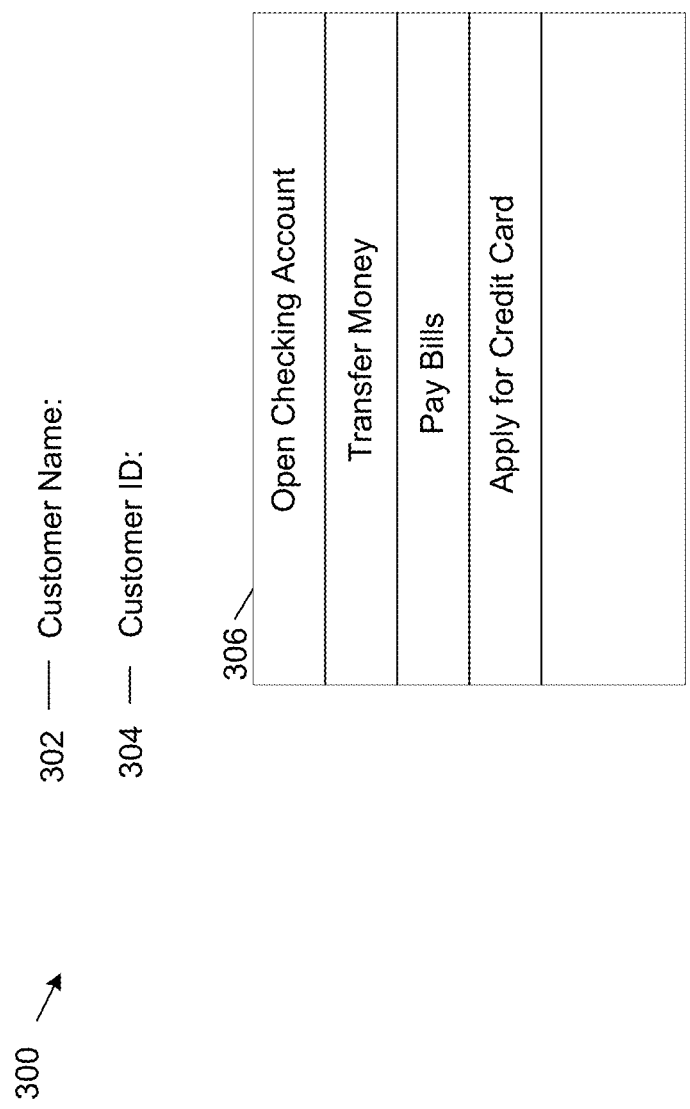
FIG. 3 shows an example graphical user interface (GUI) for a dynamic dashboard generated by the dashboard engine of FIG. 2.

FIG. 3 shows an example GUI 300 that provides a customer view of customer business applications running on the production server computing device 106. The GUI 300 includes a display of a customer name 302 and a customer ID 304. The customer ID 304 can be a specific identifier assigned to the customer the by the financial organization. In some implementations, the customer ID 304 can be an identifier of a financial account of the customer at the financial organization. The GUI 300 can also include an example list box 306, or similar GUI component, that can list all business applications at the financial organization that are currently active for the customer. As shown in FIG. 3, the example active business applications listed include open checking account, transfer money, pay bills, and apply for credit card. Other business applications are possible.

Figure 4:
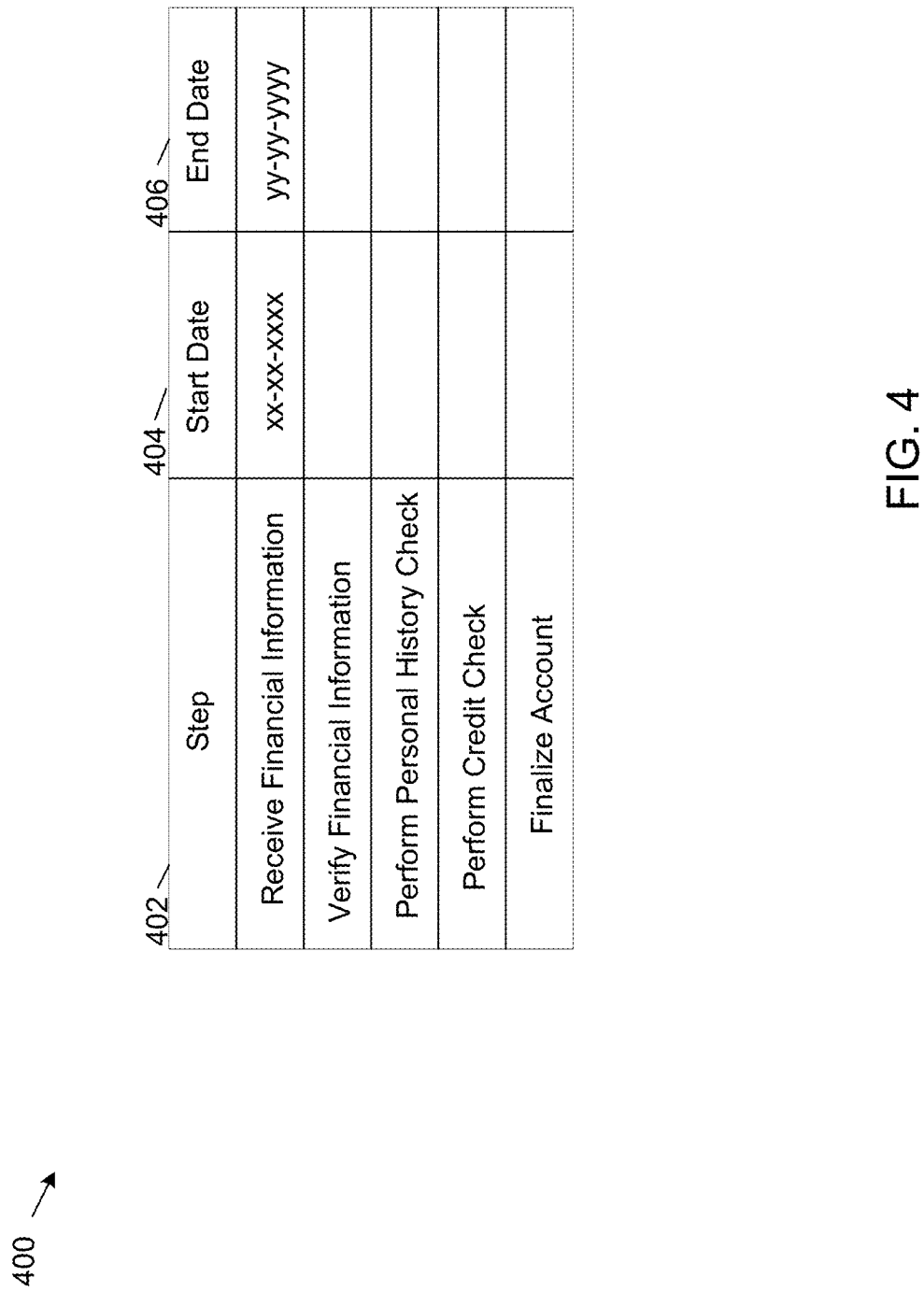
FIG. 4 shows another example GUI for the dynamic dashboard generated by the dashboard engine of FIG. 2.

FIG. 4 shows an example GUI 400 that shows operational steps 402 that comprise a specific business application and a start date 404 and end date 406 for each of these operational steps. The GUI 400 can be displayed when a specific current business application is selected from GUI 300. The GUI 400 shows the example operational steps of the open checking account business application.

As shown in FIG. 4, the example operational steps of the open checking account application include receive financial information, verify financial information, perform personal history check, perform credit check, and finalize account. More, fewer, or different steps are possible. If there is an identified problem with any of the operational steps, such that there is a known delay in completing an operational step, the operational step can flash or be displayed in a different color. When the customer selects the operational step corresponding to the identified problem, the GUI 400 can display a dialog box that can provide details regarding the identified problem. For example, the dialog box can describe the problem, indicate any remedial actions that are or can be taken, and provide a time estimate for when the problem can be corrected. The customer view module 206 can use information obtained from the application data module 202 and the operational status module 204 to provide the details for the dialog box regarding the identified problem.

FIG. 5 shows an example dialog box 500 that can provide details of an identified problem with the open checking account application. The dialog box 500 includes an example message that states that there is a problem with verifying the customer's financial information, that the problem is related to a server computing device, and that action is being taken to correct the problem. Other messages are possible.

Figure 6:
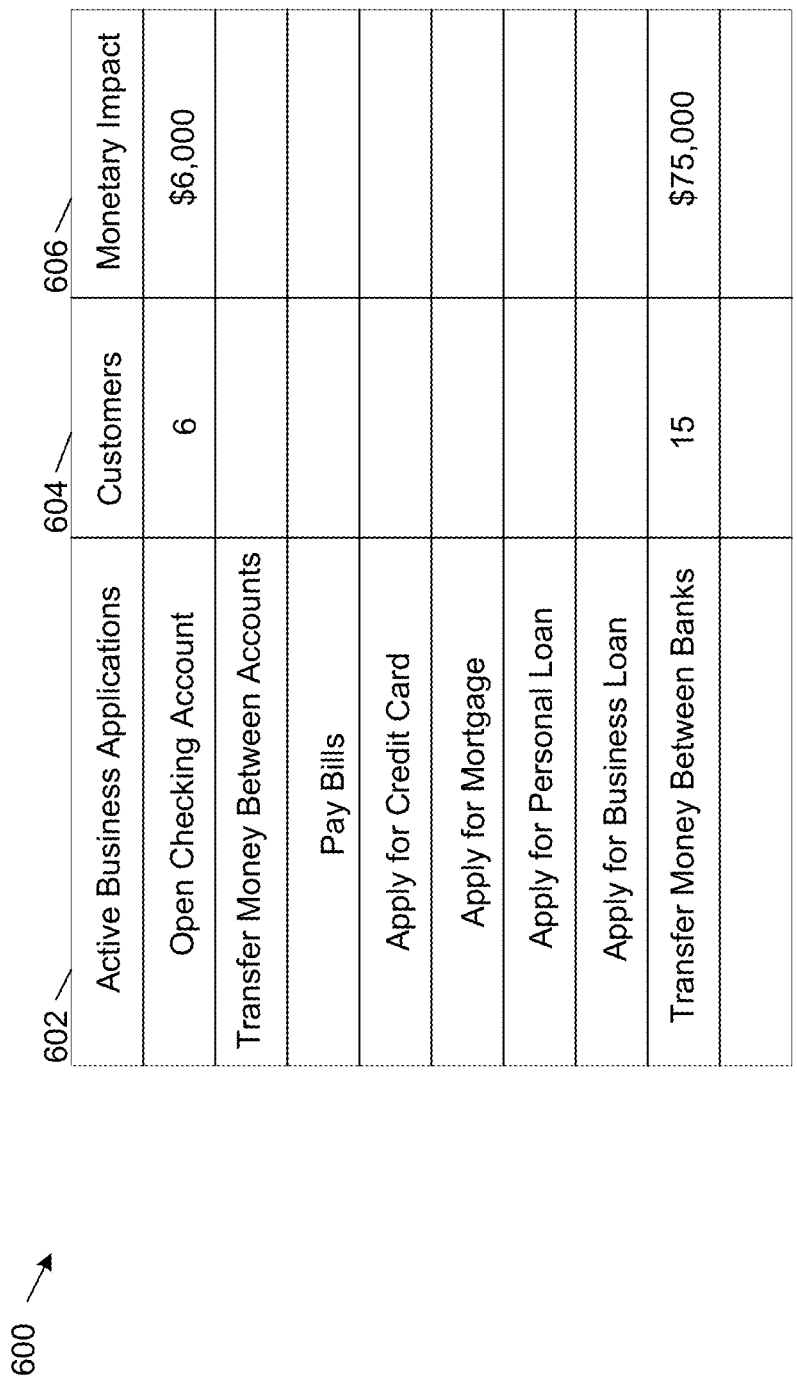
FIG. 6 shows yet another example GUI for the dynamic dashboard generated by the dashboard engine of FIG. 2.

FIG. 6 shows an example GUI 600 that provides a business team view of business applications currently running on the production server computing device 106. The GUI 600 includes columns for active business applications 602, customers 604, and monetary impact 606. As shown in FIG. 3, the example active business applications currently running on the production server computing device 106 includes open checking account, transfer money between accounts, pay bills, apply for credit card, apply for mortgage, apply for personal loan, apply for business loan, and transfer money between banks. More, fewer, or different business applications are possible.

For each of the active business applications 602 listed, the customers 604 column lists the number of customers for which each respective business application is active, and the monetary impact 606 column displays a monetary impact for each respective business application. For example, FIG. 6 shows that six customers currently have applied to open a checking account. For an estimated initial amount of $1,000 per checking account, the monetary impact is shown to be $6,000. As another example, FIG. 6 shows that there are currently 15 active money transfers between banks. For an estimated transfer amount of $5,000, the monetary impact is shown to be $75,000.

In an example implementation, the monetary impact 606 column may be rendered or be filled in based on a need to know basis. For example, the monetary impact 606 column may only be rendered or filled in for business team members above a certain organizational level, for example a manager level. For other business team members, the monetary impact 606 column may not be rendered, or it may be rendered but not filled in with dollar amounts.

The GUI 600 also permits the business team to be alerted to any problems that can cause an operational impact to currently running business applications. In an example implementation, when an operational impact has been identified, as determined from information provided by the application data module 202 and the operational status module 204, the name of the impacted business application listed in the active business applications 602 column can flash or change color. When a business team member selects the impacted business application, a dialog box can be displayed with detailed information regarding the problem. For the business team, the information can be more detailed than for the customer view, indicating what the problem is, what devices are affected, and an expected time for the system to be operational.

The GUI 600 also can provide information regarding any customers who may be impacted by an operational problem with an active business application. For example, when a business team member selects a number in the customers 604 column, for example selecting the number 6, the number of customers who are currently applying to open a checking account, identification information for each customer can be provided. In this way, the business team member can contact the customer, provide support for the customer, and possibly recommend or inform the customer of an alternative action. For example the customer may be able to provide requested financial information over the telephone.

FIG. 7 shows an example dialog box 700 that can provide detailed information regarding an impacted business application. As shown in FIG. 7, dialog box 700 provides an example message indicating a problem with transferring money between banks. A production server computing device has been determined to require a manual reset. The IT department was notified on November 13, at 13:29.

Figure 8:
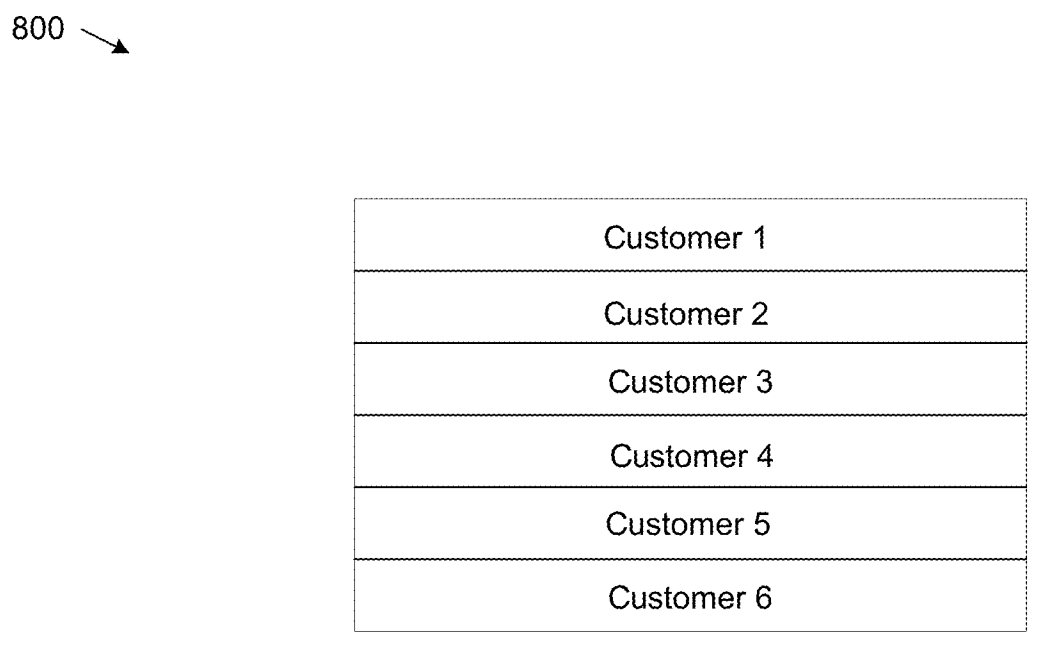

FIG. 8 shows an example GUI 800 that provides an example listing of customers whose applications to open a checking account are currently being processed. The GUI 800 is activated when the number 6 is selected in the customers 604 column of GUI 600. As shown in FIG. 8, GUI 800 lists the names of the six customers. A member of the banking team can view detailed information for any of the customers by selecting a customer from the list. In an example implementation, selecting one of the customers from the list can cause the dynamic dashboard to display a status of the customer's application for opening the checking account, similar to the display in GUI 400. Before the business team member contacts the customer, the business team member can obtain specific information about the operational status of the customer's application and of any financial impact to the customer.

Figure 9:
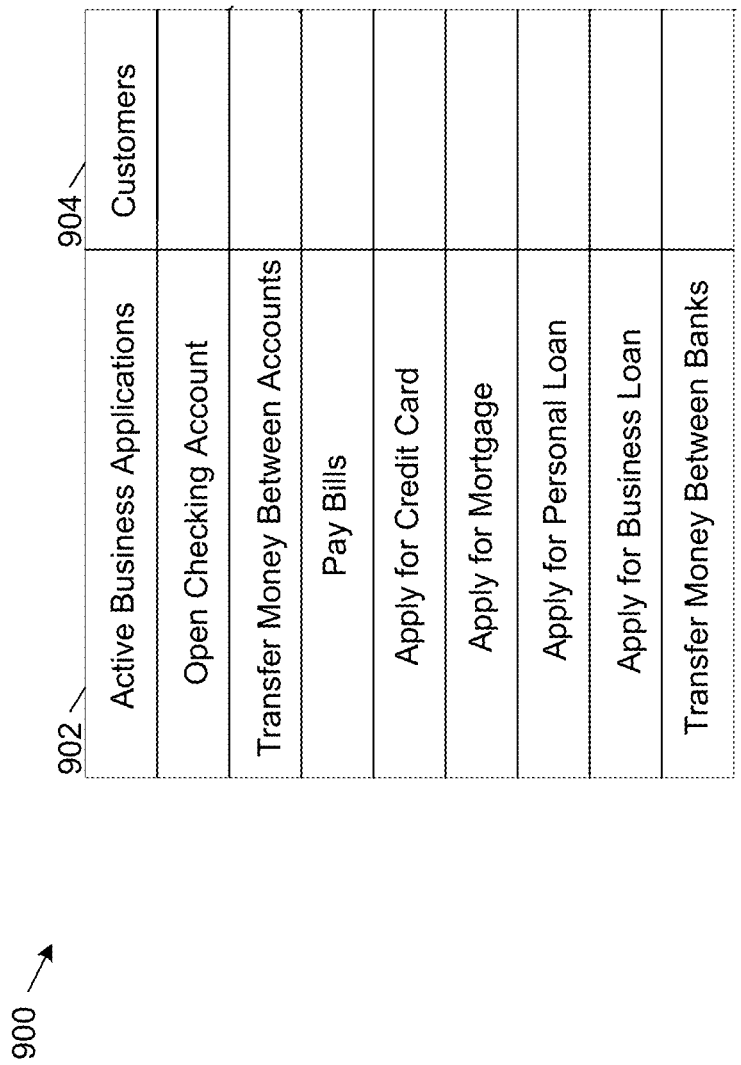
FIG. 9 shows yet another example GUI for the dynamic dashboard generated by the dashboard engine of FIG. 2.

FIG. 9 shows an example GUI 900 that provides an IT team view of business applications currently running on the production server computing device 106. The GUI 900 includes columns for active business applications 902 and for customers 904. The example currently running business applications listed include open a checking account, transfer money between accounts, pay bills, apply for a credit card, apply for a mortgage, apply for a personal loan, apply for a business loan, and transfer money between banks. More fewer or different business applications are possible. The customers 904 column shows the number of customers for which a corresponding business application is currently active. Selecting a number in the customers column can provide detailed information regarding the customers associated with the corresponding business application, similar to GUI 800 of FIG. 8.

The GUI 900 permits IT team members to quickly determine a status of a currently running business application and a status of the devices and other components used to implement the business application. For example, when the application data module 202 and the operational status module 204 receive information that one of the currently running business applications has been impacted by an existing threat or a potential threat, the business application name in the GUI 900 can flash or change color. When the IT team member selects a business application that is flashing or has changed color, the IT team member can view a status of the devices and other components used to implement the business application.

Figure 10:
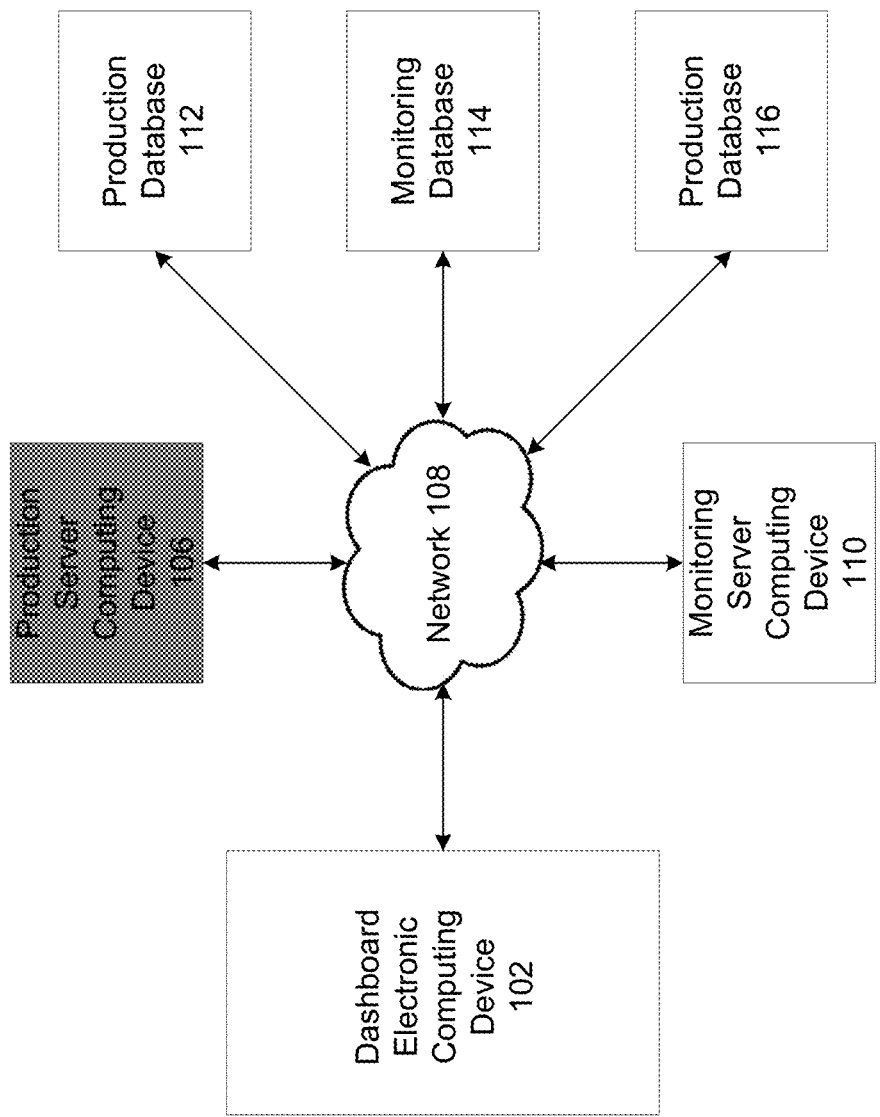
FIG. 10 shows an example system diagram that can be activated from the example GUI of FIG. 9.

FIG. 10 shows an example system diagram 1000 that can show which device or component is or may be impacted by the existing threat or potential threat. The system diagram 1000 shows system 100 of FIG. 1, but with an indication of the impacted device or component. As shown in FIG. 10, the production server computing device 106 is shown in a solid color, identifying the production server computing device 106 as being the impacted device. In some implementations an impacted device may be identified by a specific color, for example red, by a type of shading, or by flashing.

When the IT team member selects an impacted device or component, in an example implementation, a dialog box 1100 can be displayed that can provide detailed information regarding the impacted device or component. FIG. 11 shows an example dialog box that can provide detailed information that may be helpful to the IT team member. The detailed information indicates that the problem is the same as reported to the business team in dialog box 700, i.e. that a production server computing device requires a manual reset. However, more detailed information is provided to the IT team member than was provided to the business team member. For example, the detailed information in dialog box 1100 provides identification for the specific production server computing device that is impacted, in this case a production server computing device having an ID number of 12345. In addition, the detailed information informs the IT team member that data backup operations are proceeding, and that the manual reset is currently scheduled for Nov. 13, 2019 at 13:45.

Figure 12:
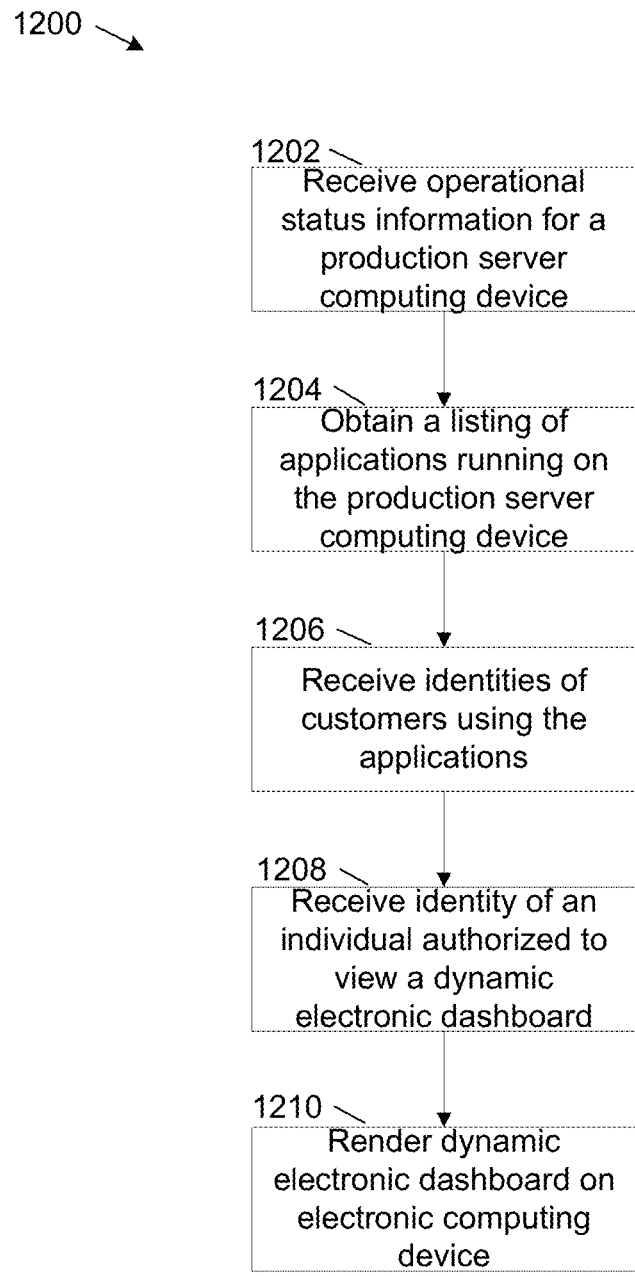
FIG. 12 shows a method for rendering the dynamic dashboard.

FIG. 12 shows a flowchart for an example method 1200 for rendering a dynamic dashboard on an electronic computing device. The dynamic dashboard includes information regarding business applications currently running on a production server computing device and an operational status of devices and components used to implement the business applications. For the method 1200, the production server computing device is the production server computing device 106.

At operation 1202, the electronic computing device receives operational status information for the production server computing device 106. The operational status information is obtained from an electronic computing device that is monitoring the operation of the production server computing device 106. For the method 1200, the monitoring electronic computing device is the monitoring electronic computing device 110. The operational status information indicates whether the monitoring electronic computing device 110 has detected any operational threats to the production server computing device 106.

At operation 1204, the electronic computing device receives a listing of business applications currently running on the production server computing device. The listing of the business applications currently running is comprises of currently running business applications that are initiated by or for customers of a financial organization associated with the production server computing device 106. Example business applications can include opening a checking account, applying for a mortgage, and transferring funds.

At operation 1206, the electronic computing device receives identities of the customers who are using or otherwise associated with the business applications listed at operation 1204. The business applications can be initiated by the customer, for example applying to open a credit card, or the business applications can be initiated by the financial organization or a third party, for example transferring money between banks.

At operation 1208, the electronic computing device receives an identity of an individual authorized to view the dynamic dashboard. For method 1200, the individual can be from one of three groups, customers of the financial organization, business team members of the financial organization, and IT team members of the financial organization.

At operation 1210, the electronic computing device renders the dynamic dashboard with a view that corresponds to the identity of the individual authorized to view the dynamic dashboard.

Figure 13:
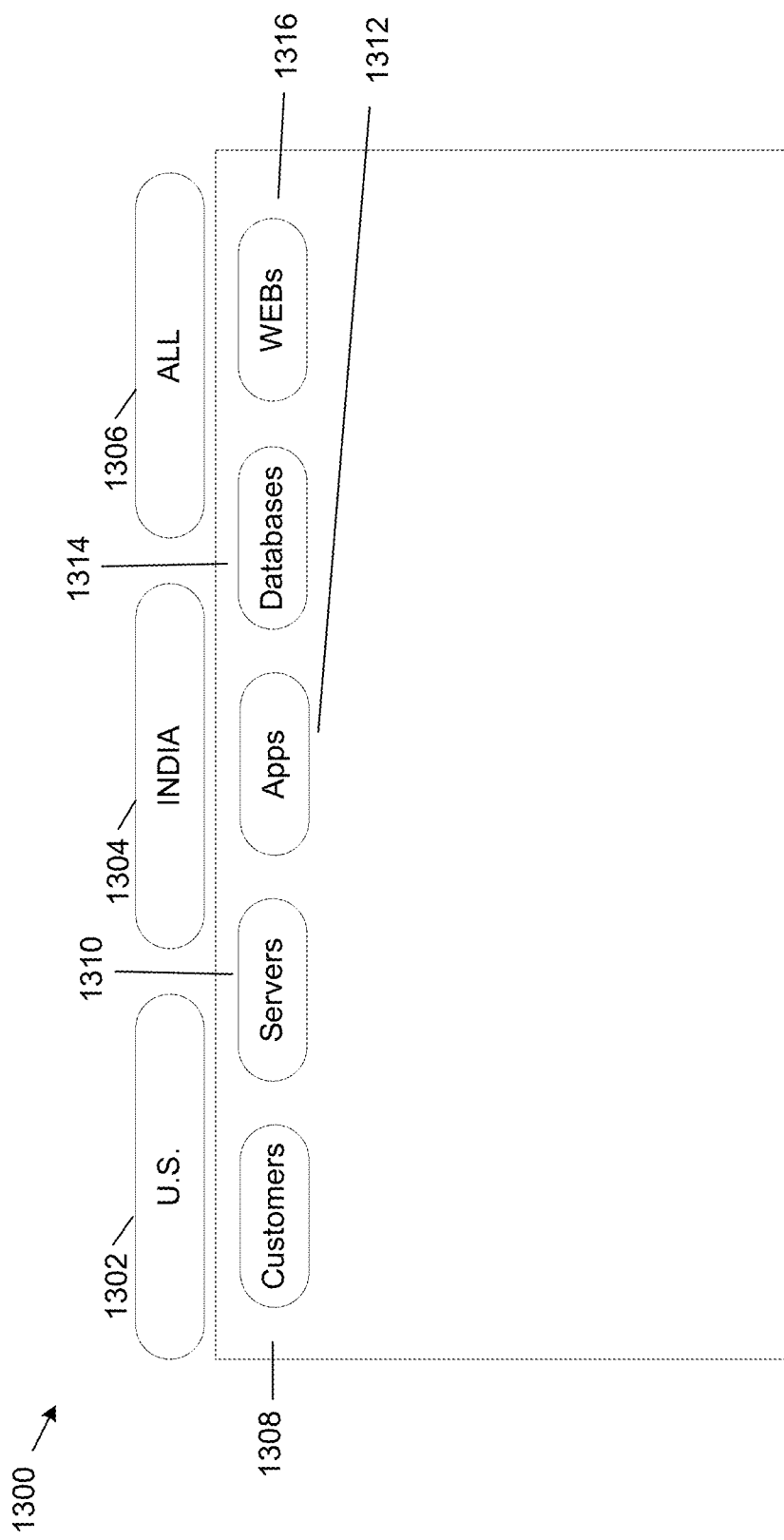
FIG. 13 shows an example GUI for an alternative dynamic dashboard generated by the dashboard engine of FIG. 2.

FIG. 13 shows an example GUI 1300 for an alternate embodiment of the dynamic dashboard. The GUI 1300 permits all authorized employees of the financial organization to view the dynamic dashboard. The authorized employees can include management, business team members, and IT team members. Because the alternate embodiment of the dynamic dashboard can include organization proprietary information, customers may not be permitted to view GUI 1300. Alternatively, tabs of GUI 1300 that contain the organization proprietary information may be hidden or grayed out for non-authorized individuals. In this same manner, certain sections of GUI 1300 for management and business team members may be hidden or grayed out based on a need to know for the management and business team members.

The GUI 1300 includes example top level tabs 1302, 1304, and 1306. Top level tab 1302 permits a view of GUI 1300 for customers and equipment located in the United States. Tab level 1304 permits a view of GUI 1300 for customers and equipment located in India. Tab level 1306 permits a view of GUI 1300 for customers and equipment located both in the U.S. and in India. In other alternate embodiments, more fewer or different countries can be included.

The GUI 1300 also includes example secondary tabs which can display information regarding customers, server computing devices, business applications, databases, and web host computing devices corresponding to the top level tab 1302, 1304, and 1306 selected. For GUI 1300, corresponding to the top level tab 1302, 1304, and 1306 selected, the example customers 1308 tab permits a listing of customers for the financial organization, the example servers 1310 tab permits a listing of the server computing devices used by the financial organization, the example apps 1312 tab permits a listing of the business applications currently running on the production server computing device 106, the example databases 1314 tab permits a listing of the databases used by the financial organization, and the webs 1316 tab permits a listing of the web hosting computing devices used by the financial organization. More, fewer, or different secondary tabs are possible.

In an example implementation, when the customers 1308 tab is selected, selection of a specific customer can provide customer identification and application specific information similar to that shown in FIGS. 3, 4, 5, and 8 of this disclosure. Similarly, selection of the apps 1312 tab can provide application specific information similar to FIGS. 6, 7, and 9 of the present disclosure.

Figure 14:
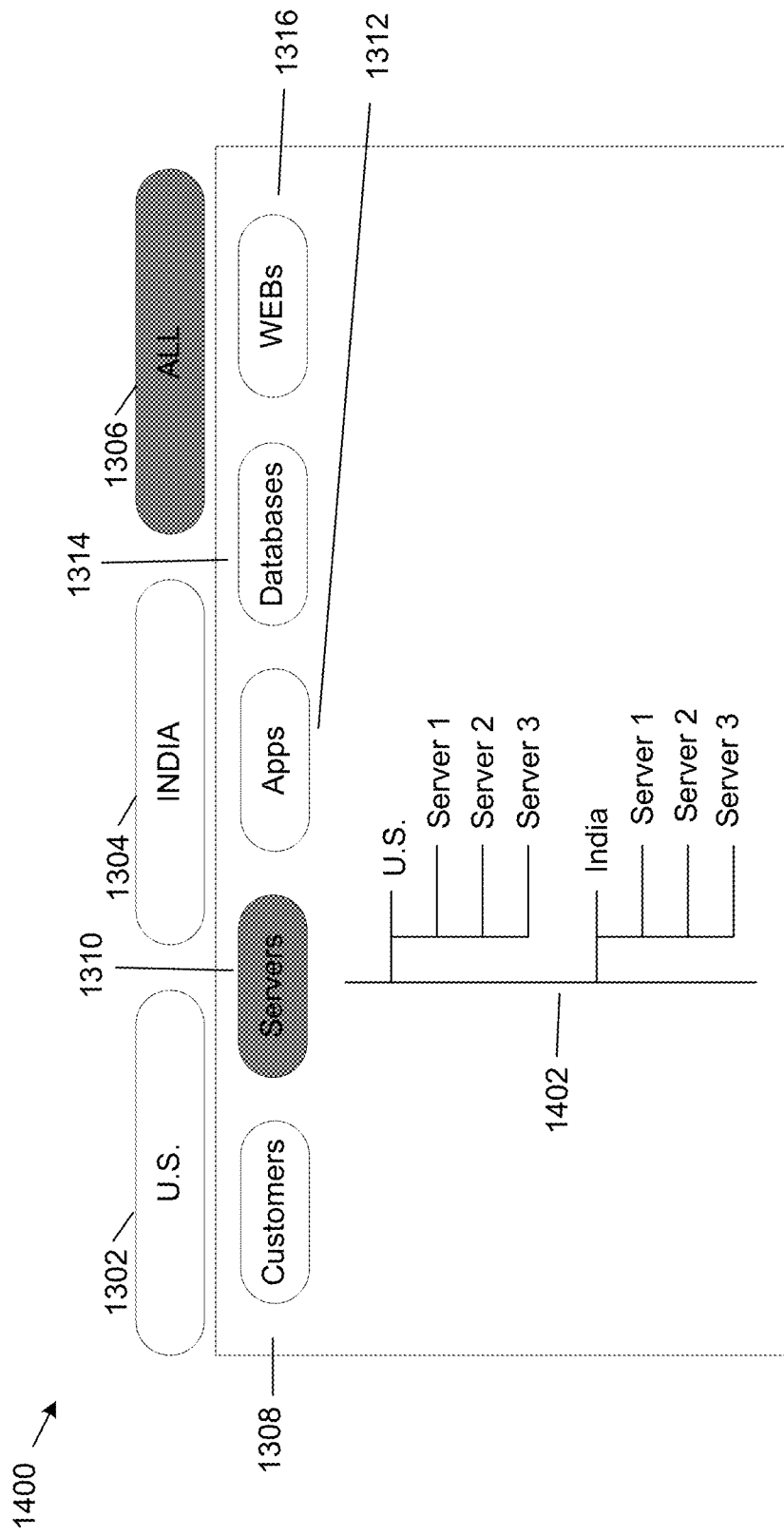
FIG. 14 shows another example GUI for the alternative dynamic dashboard generated by the dashboard engine of FIG. 2.

FIG. 14 shows an example GUI 1400. The example GUI 1400 can be rendered when both the 1306 tab and the servers 1310 tab of the GUI 1300 are selected. Selection of the all 1306 tab and the servers 1310 tab provides a graphic 1402 of the server computing devices used by the financial organization in both the United States and India. Selection of one of the server computing devices can display details of the selected server computing device. The details can include a specific identifier and a location for the server computing device and an operational status of the server computing device. In some implementations, the operational status can be visually indicated by a color of the listed server computing device name. For example a green color can indicate that the server computing device is operational, a yellow color can indicate that a potential threat has been detected, but that the server computing device is still operational, and a red color can indicate that the server computing device is not operational. In some implementations, the operational status can include data such as a temperature and a percent utilization of a processor of the server computing device, a size of a memory cache, and other data.

Figure 15:
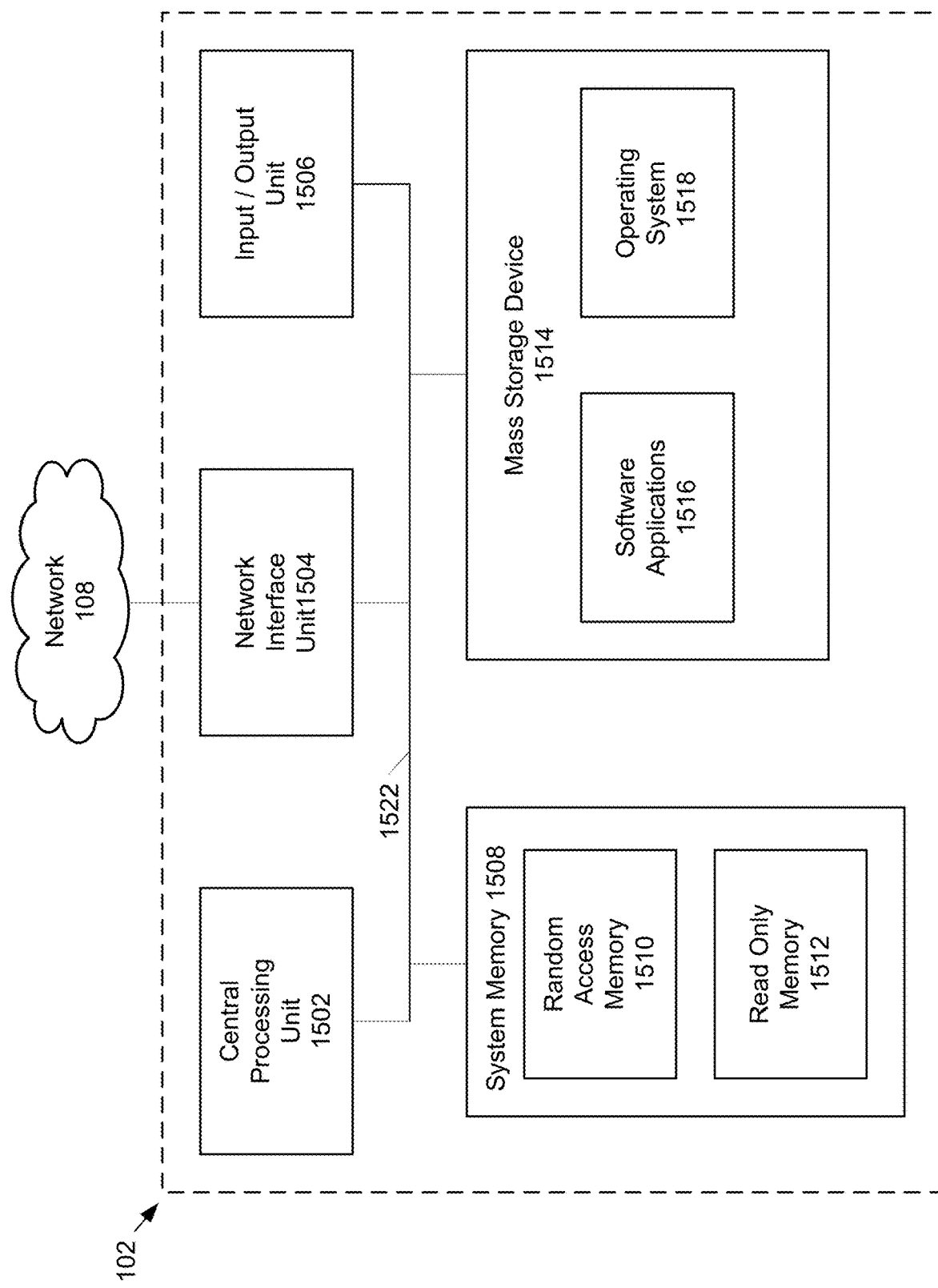
FIG. 15 shows example physical components of the dashboard electronic computing device of the system of FIG. 1.

As illustrated in the example of FIG. 15, dashboard electronic computing device 102 includes at least one central processing unit ("CPU") 1502, also referred to as a processor, a system memory 1508, and a system bus 1522 that couples the system memory 1508 to the CPU 1502. The system memory 1508 includes a random access memory ("RAM") 1510 and a read-only memory ("ROM") 1512. A basic input/output system that contains the basic routines that help to transfer information between elements within the dashboard electronic computing device 102, such as during startup, is stored in the ROM 1512. The dashboard electronic computing device 102 further includes a mass storage device 1514. The mass storage device 1514 is able to store software instructions and data. Some or all of the components of the dashboard electronic computing device 102 can also be included in the production server computing device 106 and the monitoring electronic computing device 110.

The mass storage device 1514 is connected to the CPU 1502 through a mass storage controller (not shown) connected to the system bus 1522. The mass storage device 1514 and its associated computer-readable data storage media provide non-volatile, non-transitory storage for the dashboard electronic computing device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data.

Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the dashboard electronic computing device 102.

According to various embodiments of the invention, the dashboard electronic computing device 102 may operate in a networked environment using logical connections to remote network devices through the network 108, such as a wireless network, the Internet, or another type of network. The dashboard electronic computing device 102 may connect to the network 108 through a network interface unit 1504 connected to the system bus 1522. It should be appreciated that the network interface unit 1504 may also be utilized to connect to other types of networks and remote computing systems. The dashboard electronic computing device 102 also includes an input/output controller 1506 for receiving and processing input from a number of input devices. Similarly, the input/output controller 1506 may provide output to a display screen or other type of output device.

As mentioned briefly above, the mass storage device 1514 and the RAM 1510 of the dashboard electronic computing device 102 can store software instructions and data. The software instructions include an operating system 1518 suitable for controlling the operation of the dashboard electronic computing device 102. The mass storage device 1514 and/or the RAM 1510 also store software instructions and software applications 1516, that when executed by the CPU 1502, cause the dashboard electronic computing device 102 to provide the functionality of the dashboard electronic computing device 102 discussed in this document. For example, the mass storage device 1514 and/or the RAM 1510 can store software instructions that, when executed by the CPU 1502, cause the dashboard electronic computing device 102 to display received data on the display screen of the dashboard electronic computing device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for rendering a dynamic dashboard for an electronic computing device, the method comprising:
   receiving data regarding a server computing device, the data indicating whether there are any current or potential problems that impact an operation of the server computing device;
   obtaining information regarding any business applications currently running on the server computing device;
   obtaining information regarding customers using the business applications currently running on the server computing device;
   creating the dynamic dashboard that includes the information regarding the customers and the business applications currently running on the server computing device and that describes any current or potential problems based on the data;
   tailoring content of the dynamic dashboard based upon an identity of an individual who is accessing the dynamic dashboard; and
   rendering, on the electronic computing device, a view of the dynamic dashboard,
   wherein, in response to receiving a selection of a currently running business application for which there is an operational problem, rending a network diagram that identifies a component or device in which the operational problem is occurring.

2. The method of claim 1, wherein the view of the dynamic dashboard is programmed for a customer of a financial organization.

3. The method of claim 2, wherein the view of the dynamic dashboard lists all currently running business applications initiated by or for the customer.

4. The method of claim 3, further comprising:
   receiving another selection of one of the currently running business applications initiated by or for the customer; and
   rendering another view listing operational steps comprising the one of the currently running business applications initiated by or for the customer.

5. The method of claim 4, further comprising showing a completion status of one or more of the operational steps.

6. The method of claim 5, further comprising providing an indication of a delay in a completion of one of the one or more operational steps.

7. The method of claim 1, wherein the view of the dynamic dashboard is configured for a business team member of a financial organization.

8. The method of claim 7, wherein the view of the dynamic dashboard lists all currently running business applications on the server computing device that are initiated by or for the customers using the business applications.

9. The method of claim 8, wherein the view of the dynamic dashboard lists a quantity of customers associated with each of the currently running business applications.

10. The method of claim 9, further comprising:
    receiving another selection of the quantity of customers for one of the currently running business applications; and
    rendering another view providing identification information for each of the quantity of customers.

11. The method of claim 8, wherein the view of the dynamic dashboard lists a monetary impact of one or more of the currently running business applications.

12. The method of claim 11, wherein of the dynamic dashboard listing of the monetary impact is visible only to specified business team members.

13. The method of claim 1, wherein the view of the dynamic dashboard is configured for an information technology (IT) team member of a financial organization.

14. A method for rendering a dynamic dashboard for an electronic computing device, the method comprising:
    receiving data regarding a server computing device, the data indicating whether there are any current or potential problems that impact an operation of the server computing device;
    obtaining information regarding any business applications currently running on the server computing device;
    obtaining information regarding customers using the business applications currently running on the server computing device;
    creating the dynamic dashboard that includes the information regarding the customers and the business applications currently running on the server computing device and that describes any current or potential problems based on the data;

tailoring content of the dynamic dashboard based upon an identity of an individual who is accessing the dynamic dashboard; and rendering, on the electronic computing device, a view of the dynamic dashboard, wherein the view of the dynamic dashboard lists all currently running business applications on the server computing device that are initiated by or for the customers using the business applications and also lists a quantity of customers for each of the currently running business applications.

15. The method of claim 14, further comprising:

receiving information that there is an operational problem for one of the currently running business applications; and rendering in a distinct manner a listing of the currently running business application for which there is the operational problem.

16. The method of claim 14, wherein the view of the dynamic dashboard is programmed for a customer of a financial organization.

17. The method of claim 16, wherein the view of the dynamic dashboard lists all currently running business applications initiated by or for the customer.

18. The method of claim 17, further comprising showing a completion status of one or more operational steps.

19. The method of claim 18, further comprising providing an indication of a delay in a completion of one of the one or more operational steps.

20. The method of claim 14, wherein the view of the dynamic dashboard is configured for a business team member of a financial organization.

\* \* \* \* \*

UNITED STATES PATENT AND TRADEMARK OFFICE
CERTIFICATE OF CORRECTION

PATENT NO. : 10,936,982 B1
APPLICATION NO. : 16/740824
DATED : March 2, 2021
INVENTOR(S) : Ghosh et al.

Page 1 of 1

It is certified that error appears in the above-identified patent and that said Letters Patent is hereby corrected as shown below:

In the Claims

Column 12, Line 46-47, Claim 12: delete "wherein of the dynamic dashboard" and insert --wherein the dynamic dashboard--

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*